Patented May 5, 1953

2,637,621

UNITED STATES PATENT OFFICE 2,637,621

TEXTILE DECORATING PIGMENT COLOR COMPOSITION CONTAINING A PHENOL-EPIHALOHYDRIN CONDENSATION PRODUCT

Laszlo Auer, South Orange, N. J.

No Drawing. Application May 2, 1949, Serial No. 91,009

19 Claims. (Cl. 8—69)

GENERAL OUTLINE OF INVENTION

Textile printing and dyeing is conventionally done with dyestuffs, which are water soluble or are developed on the fibers from water soluble intermediates. The application of dyestuffs is a multistep process and frequently the ultimate color is not visible at the stage when the fabrics leave the printing or dyeing machinery. This causes difficulties in control and to avoid "seconds" needs great skill and lots of luck too.

Dyestuffs, in general, have more or less limited light fastness, particularly in light or pastel shades. Fade-o-meter is an accepted apparatus to measure light fastness in an accelerated manner. Whereas automobile lacquers or resin finishes are required to be fast to Fade-o-meter exposure for 1000 hours, dyed fabrics or fabrics printed with dyes, fade in less than 48 hours, in most cases, and 10 to 20 hours' exposure fastness has to be accepted with many shades.

Pigments, in general, are more light fast than dyes, and therefore pigment printing and pigment dyeing was the aim of the art since quite some time. As pigments are dry powders and insoluble in water or organic solvents, they have to be adhered to the fabric by a resinous binder. A particularly successful binder for pigments was found in the combination of oil modified alkyd resins and organic solvent soluble amino-aldehyde resins, such as butyl modified urea formaldehyde resins or butyl modified melamine formaldehyde resins. For printing, water-in-oil emulsion colors are used, whereas for solid color dyeing, it is customary to use oil-in-water emulsions. The "oil phase" of such emulsions consists of the binder resin, usually comprising an alkyd resin component and an amino-aldehyde resin component, in the presence or absence of organic solvents. The pigments may be incorporated either in the oil phase or the water phase.

The general drawback of pigment colors is their crocking. Crocking is marking off by abrasion to an unprinted and not dyed portion of the fabric, or to fabric in general. The crocking of pigment colors is their main drawback, which prevents increase in their use for coloring textiles. Also the washability and dry cleaning resistance of pigment colored fabrics requires improvement, particularly if high temperatures of "curing" is to be avoided. Textile plants have low pressure steam available and for curing or thermosetting the amino-aldehyde resins temperatures of 275 to 300° F. are needed.

The instant process represents a great improvement in pigment colors. A new resin binder is used in the new water emulsion textile colors, which is a polyester formed by drying oil fatty acids esterified with the condensation product of epihalohydrins or dihalohydrins with polynuclear phenols, such as bis-phenol. These condensation products have free hydroxyl groups, which esterify with fatty acids, like polyhydric alcohols do, and are themselves resinous in character. For sake of brevity, the polyester binders of the instant process will be referred to as E-polyester resins.

The E-polyester resins yield textile colorings with great resistance to laundering, wet abrasion, dry abrasion, dry cleaning, form thermoset films at low temperatures and permit the production of low crock prints and solid color effects. Additional advantages of the instant process will become obvious, as the various process steps are described.

E-POLYESTER BINDERS

The E-polyester binders of this invention consist of an alcohol component and a fatty acid component.

Alcohol component of E-polyesters

The alcohol component of the E-polyesters of this invention are resinous condensation products of epihalohydrins or dihydrins with polynuclear phenols, like $(p\text{-HOC}_6\text{H}_4)_2\text{—CMe}_2$, Me being a methyl radical. The most common type of this group is represented by the condensation products of epichlorhydrin with bis-phenol. The following resinous alcohols can be prepared by such condensation:

| Resin No. | Combining Weight | Melting Point, ° C. |
|---|---|---|
| 1 | 132 | 65–75 |
| 2 | 174 | 95–105 |
| 3 | 188 | 125–135 |

These products are substantially free of halogens and could be considered as ethylene oxide derivatives of polynuclear phenols, showing free hydroxy groups, which can enter into esterification reactions.

Fatty acid component of E-polyesters

The fatty acid components may be fatty acids of naturally occurring fats and fatty oils. Examples are: oleic acid, linoleic acid, linolenic acid, clupanodonic acid, dehydrated ricinoleic acid, eleostearic acid, natural mixtures of soyabean fatty acids, sunflower oil fatty acids, linseed oil fatty acids, dehydrated castor oil fatty acids, tung oil fatty acids, stearic acid, palmitic acid, lauric acid, tall oil acids, etc. Rosin may be used to replace part of the fatty acids. Normally these fatty acids have 12 to 24 carbon atoms in the molecule. Unsaturated fatty acids obtained from drying and semi-drying fatty oils are preferred for this invention, as they reach the "thermo-set" stage at room temperature or at low temperatures, not exceeding 220° F. at reasonable speed. Linseed oil fatty acids and dehydrated castor oil fatty acids are examples of products with merit in this process. Rosin acids may be present to replace part of the fatty acids. E. g. linseed oil fatty acids and rosin may be combined simultaneously with the alcohol component.

Resinous E-polyesters

The following examples are given for the preparation of the E-polyester binders, suitable in the instant process:

EXAMPLE 1

| | Pounds |
|---|---|
| Alcohol component resin #2, with combining weight of 174 | 1,102 |
| Rosin, W. G. grade | 243 |
| Linseed oil fatty acids | 1,230 |
| Petroleum aromatic solvent with boiling range from 318 to 400° F. and flash point of 100° F. | 680 |
| Mineral spirits | 681 |
| Total | 3,936 |
| Loss of water of esterification | 205 |
| Yield | 3,731 |

Heat to 480° F. alcohol component resin, fatty acids and rosin, hold for one hour, hold for proper viscosity when thinned. Preferably pass inert gas through reaction mass, during heating. Thin. The yield is 472 gallons, 7.90 lbs./gal., non-volatile content 65%, acid number 12, viscosity $Z-Z_2$, Gardner scale.

EXAMPLE 2

| | Pounds |
|---|---|
| Alcohol component resin #2, with combining weight of 174 | 2,540 |
| Dehydrated castor oil fatty acids | 1,695 |
| Xylol | 3,435 |
| Total | 7,670 |
| Loss of water of esterification | 400 |
| Yield | 7,270 |

Esterification reaction starts at 350 to 400° F. Raise temperature from 400° F. to 500° F. in 1½ to 2 hours, pass inert gas through reaction mixture, hold until acid number is 2.–. Thin. Yield is 898 gallons, non-volatile 55%, 8.10 lbs./gal., acid number 0.5 to 2.–, viscosity X to Z on Gardner scale. This resin is further reduced to 50% N. V. with xylol for use in the examples.

Both the resin of Example 1, and that of Example 2, can be made by the solvent process of esterification, in the presence of small amounts of solvent, while the solvent is refluxed and the condensed water separated before the refluxing condensed solvent is returned to the reaction mixture. Temperature curve has to be adjusted to yield the same constants of the end product.

TEXTILE PRINTING COLORS

Water-in-oil emulsion type

Present day water emulsion textile printing colors are the water-in-oil emulsion type. To prepare such colors, suitable emulsifying agents are needed. It was found that the following emulsifying agents are particularly suitable to make water-in-oil emulsion textile printing colors:

Morpholine soaps of fatty acids, like morpholine oleate, morpholine linoleate, etc.,
Diethylenetriamine soaps of fatty acids, like the oleate and linoleate,
Pine oil,
Sodium sulfite solubilized quebracho extract,
Aluminum naphthenate,
Aluminum resinate formed with the maleic adduct or rosin,
Methyl cellulose,
Glycol esters of alginic acid,
Organophilic quaternary ammonium compounds, cation active,
Organophilic non-ionic emulsifying agents,
Polyvalent metal and amine soaps.

Acetic acid in the water phase, promotes stability of water-in-oil emulsions. Also small amount of salts dissolved in the water phase, like sodium chloride, promote the formation of water-in-oil emulsions.

Suitable pigments are alkali resistant pigments with high tinting power. As the solids (non-volatile portion) of the printing color is low, very high grade color dispersion is essential for success and colors with high tinting value are suitable only. Under "tinting," in a conventional sense, we understand the coloring power of a pigment, when added to a white paint. In textile printing the white paint is replaced by the white fabric on which we print. The colors are formed by the transparent tinting of the printed deposit, on the white background. In other words, the color deposited does not hide the background color and the visible shade is the composite effect of the pigment in the deposited print and the white of the fabric. The same colors, when printed on dark pre-dyed background, do not show much of their own color and to have a visible effect, the background color has to be destroyed by discharging same. (Discharge printing.) Most suitable colors are as follows: Blacks: carbon black, lamp black, aniline black. Blues: Phthalocyanine blue, insoluble azo pigments, like dianisidine blue. Green: Phthalocyanine green, Pigment Green B. Yellows: precipitated iron oxide yellows, insoluble azo pigments, like benzidine yellow, Hansa yellow, in some instance also lead chromate yellows. Oranges: Insoluble azo colors, like benzidine orange, and some orange shaded scarlets. Reds: Insoluble azo pigments of the Naphthol AS series, in certain instances, where alkali resistance requirements are less strict: Beta - ortho - naphthoic acid couplings (metal salts) may be used, and metal salts of the acid of Pigment Red 2B. Inorganic reds, like iron oxides, precipitated, or cadmium reds may also be used, but they have much less tinting strength, than the insoluble azo pigments. Browns: precipitated iron oxide browns, vat browns, etc. Violets: where alkali resistance is important, vat pigment colors are used of the indigoid, thioindigoid and indanthrene type. Helio rubine BL may be used, where alkali resistance is less important. Dry cleaning resistance may require change of choice. Few colors are resistant to bleeding in alkali and simultaneously resistant to bleeding in dry cleaning fluids.

Pigments may be incorporated by 2 basic methods: I. Dispersed in the oil phase or in a component miscible with the oil phase. II. Dispersed in water, as water slurries or water pulps. In method I the colors may be flushed into the oil phase from a water slurry, by suitable methods, known in the art. Method II may well be used, as the water forms the discontinuous phase in water-in-oil emulsions, and before drying, the oil phase will surround the dispersed pigment particles.

Additives to resin binder

The E-polyester binders are very much incompatible with most organic film formers. They do not require additives to yield toughness and resistance to chemical action. However, smaller quantities of organic solvent soluble urea formaldehyde resins, organic solvent soluble melamine formaldehyde resins and ethyl cellulose may be mentioned as modifying additives, which may increase further film toughness. Melamine resins require heat for conversion. However, urea resins can be catalyzed for low temperature conversion, and ethyl cellulose does not require any conversion.

The following examples will illustrate the preparation of suitable water-in-oil resin emulsion colors from E-polyester binders:

Examples of water-in-oil emulsion printing colors

When printing with water-in-oil emulsion printing colors, it is customary to prepare so called color concentrates, which contain the major portion of the resin binder and all of the color. Further it is customary to prepare an extender clear emulsion, which is called herein "cut-back" emulsion, which consists of a major portion of volatile material and a small portion of non-volatile matter. The latter is a mixture of binder resin, other additives as film formers, and in many cases an emulsifying agent. The cut-back emulsion may be prepared in 2 steps: first: making a concentrate and second: making the finished cut-back emulsion from the concentrate of the cut-back. In the examples here below, the cut-back emulsions are shown prepared in one step, yielding the finished product. To get required color strength, the color concentrate (1 part) is mixed with one or more parts of the cut-back emulsion. These cuts are called, depending on the proportion, 1:2, 1:3, 1:6, 1:10, 1:20, 1:50, 1:100 cuts, the first figure being the color concentrate.

The color concentrates contain 15 to 40% non-volatile portion, the rest consisting of solvents and water. The water in the water-in-oil emulsions acts as bodying agent, whereas solvents act as thinning agents. The non-volatile portion of the color concentrates contains less than 50% pigment toner (not counting extender pigments) and in most cases the pigment content does not exceed one third of the non-volatile content. Pigment concentrates contain 3 to 15% pigments, depending on the pigment used, its tinting strength and general behavior.

PREPARATION OF COLOR CONCENTRATES

EXAMPLE 3

*Pigment grind.*—320 parts of phthalocyanine green toner, 80 parts of china clay, 80 parts of kaolin, 540 parts of E-polyester resin of Example 2, 50% N. V. and 220 parts of coal tar solvent, high boiling, known in the trade as Hi-Flash Naphtha (boiling range 320 to 365° F., flash point 115° F., aromatic content 90%), are mixed on a turbomixer of the high speed type, after the following dispersing aids were added, 1% of each, based on the pigment content: a nonionic surface active agent, which is an alkyl aryl polyether alcohol, soya lecithin 50%, dispersed in 50% soyabean oil, and zinc naphthenate. The mix is ground further on a suitable mill, until satisfactory dispersion is reached.

*Color concentrate.*—Mix on a high speed turbomixer 72.57 parts of above pigment grind, 33.20 parts of E-polyester resin of Example 2, 30 parts of pine oil, 114 parts of petroleum aromatic solvent mix with a boiling range from 310° to 410° F. and containing 75% aromatic solvents, 5.22 parts of butyl alcohol and 45.01 parts of water. This concentrate contains approximately 10% resin binder, 6% pigment toner and 3% extender pigment.

EXAMPLE 4

*Color concentrate.*—21.37 parts of the pigment grind of Example 3, 26.30 parts of E-polyester resin of Example 2, 3.63 parts of pine oil, 20 parts of mineral spirits, and 28.70 parts of water are mixed with a high speed turbomixer and passed through a colloid mill. In this example the proportion of resin binder to pigment toner is 17.1 to 5.25.

EXAMPLE 5

*Color concentrate.*—21.37 parts of pigment grind of Example 3, 26.30 parts of E-polyester resin solution of Example 2, 17 parts of a 10% solution of low ethoxy content ethyl cellulose, 200 cps. viscosity type, 43.5 to 44.5% ethoxyl content (dissolved in a mixture of 80% of xylol and 20% butyl alcohol), 3.63 parts of pine oil, 7 parts of mineral spirits and 24.70 parts of water are mixed and passed through a homogenizer. The proportion of binder to pigment toner is similar in this example, than in Example 4, but 10% of the E-polyester binder quantity is substituted with low ethoxylated ethyl cellulose. This substitution increases the viscosity of the color concentrate.

EXAMPLE 6

*Color concentrate.*—24.19 parts of pigment grind of Example 3, 7.07 parts of E-polyester resin solution of Example 2, 20 parts of 10% ethyl cellulose solution, described in Example 5, 10 parts of pine oil, 7 parts of petroleum aromatic solvent described in Example 3, 1.74 parts of butyl alcohol and 30 parts of water are mixed and homogenized. In this example for 6 parts of pigment toner 8 parts of E-polyester resin binder and 2 parts of low ethoxylated ethyl cellulose were used.

EXAMPLE 7

*Pigment grind.*—250 parts of insoluble azo red pigment of the Naphthol AS type, 107 parts of E-polyester resin solution of Example 2, high boiling point aromatic solvent (Hi-Flash Napththa) 314 parts, 2.5 parts of zinc naphthenate, 2.5 parts of nonionic surface active dispersing agent were mixed and dispersed by a suitable grinding equipment. Pigment content 36.98%, resin solids 7.91%.

*Color concentrate.*—136.05 parts of pigment grind, 472.50 parts of E-polyester resin solution of Example 2, 112 parts of china clay grind were mixed. The china clay grind was made by grinding 120 parts of china clay, 400 parts of 10% ethyl cellulose solution of Example 5, 1.2 parts of calcium naphthenate and 1.2 parts of nonionic surface active agent. The first mentioned mixture was emulsified to a water-in-oil emulsion concentrate by adding to each 100 parts of mixture a mix of 45.5 parts of water, 5.5 parts of 10% aqueous methyl cellulose solution, low viscosity and 0.25 part of glacial acetic acid. The mixture was homogenized.

EXAMPLE 8

*Pigment dispersion.*—50 parts of water dispersible phthalocyanine blue, containing about 40% toner pigment and about 60% dextrin, were dispersed in water of 50 parts and 1 part of an anionic aralkyl sulfonate type of dispersing agent.

*Color concentrate.*—10.5 parts of pigment dispersion of water dispersible phthalocyanine blue, 34.2 parts of E-polyester resin solution of Example 2, 3.63 parts of pine oil, 20 parts of mineral spirits and 24.75 parts of water were mixed and homogenized by passing the mixture through a colloid mill. This pigment color concentrate yields extremely low crocking prints.

EXAMPLE 9

*Pigment grind.*—75 parts of insoluble azo red toner of the Naphthol AS type, 300 parts of precipitated barium sulfate (blanc fixe), 1 part of zinc naphthenate, 1 part of nonionic surface active agent, 1 part of soya lecithine containing soyabean oil, 500 parts of a mixture of 35.1% xylol and 64.9% of E-polyester resin solution of Example 2. This mixture was well ground to yield a well dispersed pigment paste.

*Color concentrate.*—73.8 parts of pigment grind, 1.2 parts of E-polyester solution of Example 2, 2.86 parts of a butyl modified melamine formaldehyde resin (50% N. V. in 30% xylol and 20% butyl alcohol), 5.72 parts of alcohol soluble nitrocellulose, ½ sec. viscosity, dissolved 25% N. V. in alcohol, 1.8 parts of ethyl ether of ethylene glycol, 3.63 parts of pine oil, 0.63 part of drier mixture (mixed cobalt, lead and zinc driers) and a mixture of 29.4 parts of water and 0.6 part of morpholine oleate.

The nonionic surface active agent, mentioned in some of the above pigment grinds, is an alkylated aryl polyether alcohol.

EXAMPLE 10

*Pigment dispersion in water.*—600 parts of phthalocyanine blue pigment pulp in water, containing 20% pigment, 25 parts of a 2% solution of sodium alkyl naphthalene sulfonate in water, 2.5 parts of partially desulfonated sodium sulfolignin, dry powder, 6.25 parts of 20% casein solution in ammoniacal water, containing antifouling agents, 75 parts of 10% low viscosity methyl cellulose solution in water and 2.1 parts of additional dry sodium alkyl naphthalene sulfonate, are mixed and ground in a pebble mill to a uniform pigment dispersion.

*Color concentrate.*—34 parts of E-polyester resin solution of Example 2, 3.6 parts of pine oil, 30.6 parts of xylol, 0.6 part of morpholine oleate and 51.2 parts of the above pigment dispersion in water are mixed and homogenized.

In this example the phthalocyanine blue pigment pulp may be replaced by other pigment pulps, like those of benzidine yellow, benzidine orange, thioindigo pink, etc. If the pulps are not 20% strong in pigment content, the water content may be adjusted in the pigment grind. If they are more concentrated, water may be added. If they are less concentrated, some of the water soluble additives may be dissolved in the water of the pigment pulp. (They may be added dry.) Also dry colors could be made into pulps, by mixing them with water and the other ingredients of the above pigment dispersion in water.

It has been found, that in water-in-oil emulsion colors the addition of pigment from water dispersion is of advantage and lower crocking of the resulting prints occur.

Flushed colors may be prepared from water pulps of pigment colors, by mixing them with resin solutions and flushing agents. Such flushing agents are described in U. S. Patent 2,126,925. Mono-amyl amine and di-amyl amine oleates are examples of such agents. Patent 2,192,954 describes cationic flushing agents.

With regard to Example 9, it should be mentioned, that the surprising discovery was made, that nitro-cellulose cures melamine resins at room temperature. This is a very important discovery, as there is no organic solvent soluble catalyst known, which will cure alkyl (butyl) modified melamine formaldehyde resin films. Alkyl (butyl) modified urea formaldehyde resins can be catalyzed by conventional additives. Alcohol soluble nitrocellulose was used, to secure easy miscibility with the solvents present in the color concentrate.

Cut back emulsions

The cut back emulsions are the most crucial portion of a satisfactory emulsion pigment color of the water-in-oil type. In the final printing paste the color concentrate is always in minority and the cut back emulsion is the major portion. Stability and performance depend on a satisfactory cut back emulsion.

EXAMPLE 11

The cut back emulsions are best prepared by first preparing a dilute binder solution in organic solvent, which contains the emulsifying agent and some water. Additional solvent and water are mixed in under constant agitation by alternating the addition of water and solvent. The suitable equipment is manufactured by the Eppenbach Inc. Long Island City, N. Y., and is called the Eppenbach Homomixer. This is a rotary turbomixer which rotates about 3600 R. P. M. and consists of a stator and turbo-rotor. In portions water is mixed into the cut back concentrate until it becomes pasty, then solvent is added to slightly thin it out, and this is followed by the addition of more water.

In this example the summary formula of the cut back emulsion is as follows: 4 parts of a 10% low ethoxy content ethyl cellulose solution in a solvent mixture of 80% xylol and 20% butyl alcohol, are mixed with 2.6 parts of pine oil, 0.8 part of a 25% slurry of methyl cellulose coated precipitated aluminum rosinate of the maleic adduct of rosin, slurried in mineral spirits, 1.04 parts of a solution of 0.31 part of morpholine oleate in mineral spirits, 0.71 part of polyvinyl chloride emulsion, containing 0.4 part of latex solids, 21 parts of xylol and 70.96 parts of water. In this example the polyvinyl chloride latex may be replaced with a mixture of polyvinyl chloride and polyacrylonitrile latex, having 1:1 ratio of solids and adding a quantity of the mixture to replace the other latex solids part by part.

EXAMPLE 12

A similar cut back emulsion was prepared, with the following ingredients: 0.8 part of E-polyester of Example 2, solution, 2.6 parts of pine oil, 0.8 part of 25% slurry of the aluminum rosinate used in the previous example, 0.31 part of morpholine oleate, 1.11 parts of polyacrylonitrile rubber emulsion, containing 0.4 part of latex solids, 4 parts of 10% ethyl cellulose solution, used in the previous example and 71 parts of water and 23.6 parts of xylol.

EXAMPLE 13

1.2 parts of E-polyester solution of Example 2,
0.3 part pine oil,
1.5 parts natural rubber solution, 10%, in xylol,
0.12 part water solution of sodium sulfite solubilized quebracho extract, containing 25% non-volatile content,
0.06 part glacial acetic acid,
0.15 part of sodium chloride, dissolved in the water phase,
21.20 parts petroleum aromatic solvent, high flash point, 70% aromatic content.
75.47 parts water.

100.— parts.

Mixed and homogenized.

EXAMPLE 14

36.58 parts of E-polyester resin solution of Example 2, containing driers, 3.76 parts of butyl modified urea formaldehyde, resin solution, dissolved in xylol and butanol mixture, containing 1.70 parts of dry resin and 2% alkyl phosphoric acid catalyst, based on resin solids, 1.60 parts morpholine oleate, were mixed first with 101.20 parts of water, then 53.30 parts of mineral spirits were added, the pH was adjusted at this point to 4.5 by the addition of acetic acid, and additional 289.50 parts of water were added. This cut back contained about 3.4% resin solids (E-polyester), 0.34% urea resin solids, 0.31% morpholine oleate and 71% water. The balance being organic solvents.

EXAMPLE 15

A cut back concentrate was made by mixing 3.0 parts of morpholine oleate, 29.2 parts of mineral spirits and 38.2 parts of E-polyester resin solution of Example 2, totaling 70.4 parts. To this concentrate was added under Homomixer agitation 190 parts of water, followed by 100 parts of a 10% solution of high viscosity aluminum naphthenate, dissolved in the mixture of 50% xylol and 50% mineral spirits, and this was followed by the addition of 600 parts of water.

EXAMPLE 16

A cut back concentrate was made by mixing 270 parts of E-polyester solution of Example 2, 28.2 parts of butyl modified urea formaldehyde resin, 60% N. V. in xylol-butanol mixture, 125.5 parts of mineral spirits, and 7.5 parts of 60% N. V. polychloroprene (polymer of 2-chlorobutadiene) latex, and 12 parts of diethylene triamine oleate. To this mixture was added 759 parts of water, followed by 400 parts of mineral spirits and further followed by 1402 parts of water. This particular cut back emulsion produces very low crocking prints, when mixed with color concentrates.

These various cut back emulsions were mixed with the individual color concentrates in proportions of 1 concentrate to 6 cut back emulsion. The prints obtained were sharp, clear and produced after drum drying and few days standing at room temperature, well washing, well dry cleaning and low crocking effects.

The rubber solutions or emulsions mentioned above, were added to further reduce crocking. It was found, that in water-in-oil emulsions there is not much difference, whether the rubbers are added from solutions or emulsions, as the rubbers flush over into the oil phase readily from the emulsions. Natural rubber, polyvinyl chloride, polyacrylonitrile, polyvinylidine chloride and polychloroprene rubbers were tested. All reduce crocking, but most effective seems to be polychloroprene, known also under the name of neoprene. These rubbers may be added to the cut-backs, as here described, or to the color concentrates. In the latter case 1½% non-volatile elastomer (rubber) is an example of a proper quantity, per 100 parts of color concentrate.

All parts in the above examples and the examples following hereafter, are parts by weight.

Drum drying, mentioned here above, as means of drying textile fabrics, is also known in the art as can drying. The goods are passed through cans heated with live steam.

The synthetic elastomers mentioned in some of the examples, may be incorporated from solutions. In the case of polychloroprene, e. g. so called curing and non-curing cements may be used, which have adhesive power.

*Discharge printing*

Dyestuffs are transparent. If a discontinuous pattern is desired on a solid color background, dyes do not show up, if they are simply printed on the pre-dyed fabric. In discharge printing the solid color is produced by a dischargeable dye and printing is done with non-dischargeable dyes in such a manner, that the printing paste contains the discharging chemicals. E. g. vat dyes are used for printing the discontinuous pattern, whereas azoic dyes are used for solid color dischargeable backgrounds. Pigments, in the concentrations used in pigment printing produce also transparent prints, discharge pigment printing is required to produce the desired effect on solid color backgrounds.

In discharge printing with vat dyes, sodium sulfoxylate is the preferred discharging agent. This product is sometimes also called sodium formaldehyde sulfoxylate. This chemical is stable in alkaline medium at room temperature, but decomposes on the action of heat and steam in the so-called "vat agers." While decomposing, it destroys the azoic dyes of the background color.

To obtain proper discharge effects, the printing paste has to contain a large quantity of sodium sulfoxylate, dissolved in water. Up to 18 to 20% of the printing paste, by weight, may have to be sodium sulfoxylate, on dry basis. In one gallon printing paste up to 1½ to 1.75 lbs. may be require. To have so much water soluble electrolyte present in a water-in-oil emulsion, without breaking the emulsion, is a difficult task. Further difficulty is presented by the fact, that in many conventional vehicles the pigments are also attacked by the discharge chemicals. A still further difficulty is presented by the requirement, that after discharging, the decomposition products of the discharged dye and of the discharging agents have to be washed out from the fabric and print. These are below the printed film or distributed therein. These difficulties are hard to solve in practice, even if on paper statements were made, that they have been solved.

It has been found, that the E-polyester binders are extremely suitable materials to produce excellent discharge prints. Their extreme chemical resistance, yields such surprising results, when properly formulated emulsions are used, that azoic pigments of the soluble and insoluble azo pigment classes, are completely protected in the print from discharging on the action of the discharge agent present in the paste, whereas the background azoic dyes of the fabric discharge readily. The binder acts as a protective envelope for the pigments. Also they permit proper washing after discharging, without noticeable damage to the print.

Stability of the emulsions in the presence of discharge chemicals, is very important for the success of the process. The following is an example of a discharge cut-back emulsion, which can be mixed with color concentrates, to form discharge pigment printing pastes:

EXAMPLE 17

0.8 part of E-polyester solution of Example 2, 4 parts of 10% ethyl cellulose solution of Example 5, 0.8 part of the 25% slurry of aluminum rosinate of Example 11, 2.6 parts pine oil, 21.8 parts of xylol and 70 parts of a 20% water solution of sodium sulfoxylate. The product of this example, after proper homogenizing, yields a smooth pasty mobile emulsion, suitable to be mixed with color concentrates.

If acid emulsions are desired, zinc sulfoxylate yields suitable cut-back emulsions. Sodium sulfoxylate is not stable in acid media.

*Examples of oil-in-water printing colors*

Oil-in-water emulsions are easier to handle in textile plants that water-in-oil emulsions. They could be washed from the printing rollers, color boxes, doctor blades, brush rollers, etc. with water. They also could be washed from backgrays, rubber blankets with ease. There are two reasons why there is no oil-in-water type printing color on the market at the time of this writing: (1) Emulsifying agents which are suitable to produce oil-in-water emulsions and the necessary protective colloids, which secure stability, both reduce the washability of pigment prints. Present day binders do not take such reduction successfully. (2) If the same quantity of pigment color is dispersed in an oil-in-water emulsion color concentrate and in a water-in-oil color concentrate, and both are reduced in varying proportions with cut-back emulsions, the water-in-oil emulsion printing colors take more reduction to yield a certain shade, than oil-in-water emulsions. The reason is probably explained by the fact, that most pigments are hydrophobic and organophilic, flush into the oil phase, and if the color bearing oil phase is the continuous phase of the emulsion, better mileage is obtained, pound for pound of color. As the pigment colors are the most expensive ingredients of printing emulsion colors, economic factors excluded up to now the use of oil-in-water emulsions for printing, whereas they are used regularly for pigment padding, to obtain solid shades.

According to this invention, the high laundering resistance of the E-polyester binders permits the formulation of laundering resistant oil-in-water pigment printing colors. It was also possible to improve the color value conventionally obtained with oil-in-water emulsion colors, by using as bodying agents of the emulsion: solvents, instead of the conventional viscous water soluble gums or protective colloids. Cut-back emulsions with high solvent content show the necessary pasty consistency for printing and preserve mobility of the dispersed phase at the stage of conversion of the oil-in-water emulsion to water-in-oil emulsion during demulsification, so that the pigments can readily flush over to the oil phase and show proper color values.

The following examples show typical formulations of pigment printing emulsion colors of the oil-in-water type.

EXAMPLE 18

42.15 parts of E-polyester resin of Example 2, 0.31 part of mixed naphthenate driers, 12.22 parts of 10% sodium lauryl sulfate solution in water, 20.65 parts of a 20% casein solution in water, containing antifouling agents, 5.48 parts of ammonium hydroxide solution prepared by mixing 1 part of concentrated ammonium hydroxide and 1 part of water, 10.54 parts of a 20% water solution of sodium carboxymethylcellulose, low viscosity type, and 8.65 parts of water are made into an emulsion in the following manner: Add to the resin solution under agitation ⅔ of the sodium lauryl sulfate solution, mix the remaining ⅓, the water and the casein solution in a separate container and add them slowly to the resin solution containing mixture under agitation. Add the ammonium hydroxide solution and add finally the sodium carboxymethylcellulose solution. Homogenize. This emulsion is a suitable binder for color concentrates.

EXAMPLE 19

59 parts of the binder emulsion of Example 18, 26.25 parts of the phthalocyanine pigment dispersion in water of Example 10, 2.9 parts of a 60% polychloroprene latex, 3.9 parts of pine oil and 7.95 parts of water are mixed and homogenized, to form a color concentrate. Other pigments may be used instead of the phthalocyanine blue, as described in Example 10.

EXAMPLE 20

Example 18 is repeated, but using E-polyester resin solution of Example 1, after same has been reduced with mineral spirits to 50% non-volatile content. The resulting product is suitable as binder for color concentrates, like the one described in Example 19.

*Emulsion polymerized resin binders*

If the resin binder is "emulsion polymerized" or emulsion aggregated, as described in my copending applications Serial No. 739,945, filed April 7, 1947, now Patent No. 2,530,370, and Serial No. 635,611, filed December 17, 1945, now abandoned, to which this specification is a continuation-in-part, advantages result in faster solidifying binders, increased toughness and better aging qualities of the prints obtained.

EXAMPLE 21

An emulsion-aggregated binder is prepared from the E-polyester solution of Example 2, according to Example 18, by the following changes: deducting 3.58 parts of the water added, and adding 3.58 parts of a 30 volume percent hydrogen peroxide solution to the emulsion at the stage after the ammonium hydroxide solution was added, but before the sodium carboxymethylcellulose solution is added. The hydrogen peroxide is added in increments, while the emulsion is slowly agitated. The addition of the hydrogen peroxide may be carried out during a 2 to 12 hours' period. The sodium carboxymethylcellulose solution is added, after the emulsion aggregation process is completed.

EXAMPLE 21A

Example 21 is repeated with the change, that the E-polyester solution of Example 1, is used, reduced to 50% N. V. with mineral spirits, instead of the solution of Example 2.

EXAMPLE 22

A color concentrate is made of the product of Example 21, by first preparing a pigment grind from 1359 parts of Naphthol AS type pigment red, 2000 parts of E-polyester solution of Example 2, 1179 parts of xylol, and 136 parts of wetting agent mixture, consisting of one third alkyl aryl polyether alcohol, one third zinc naphthenate and one third soya lecithin. A color concentrate is prepared by mixing 59 parts of the emulsion of Example 21, 2.9 parts of polychloroprene latex 60% N. V., 12 parts of water, 15 parts of xylol, and adding thereto slowly, under proper agitation a mixture of 30.2 parts of the here described red pigment grind and 0.9 part of a sodium salt of alkylated aryl polyether sulfonate, as emulsifying agent. The pigment grind is thereby emulsified into the binder emulsion. The resulting product is homogenized by passing it through a colloid mill.

EXAMPLE 23

The product of Example 22 is repeated with the alteration, that the binder emulsion is an emulsion aggregated mixture of 90% E-polyester resin solution of Example 2 and 10% of a butyl modified melamine formaldehyde resin, containing 50% N. V., 30% xylol and 20% butyl alcohol. The presence of the melamine resin increases toughness of the film deposited as a print. The color concentrates made according to this invention are of pastry or viscous consistency by their nature.

Oil-in-water cut-back emulsions

Whereas cut-back emulsions can be formulated with no additional solvent, except the solvent present in the resin solution, it is of advantage to have solvents present up to 55% of the total weight of the cut-back emulsion.

EXAMPLE 24

This example demonstrates the low solvent content cut-back emulsion. 25 parts of the emulsion of Example 21, are mixed with 37.5 parts of water and 37.5 parts of a 3% water solution of high viscosity type methyl cellulose.

EXAMPLE 25

12.38 parts of the emulsion of Example 21, 24.75 parts of a 3% water solution of high viscosity methyl cellulose, 6.19 parts of a 10% water slurry of bentonite, high viscosity type, 55.69 parts of water and 0.99 part of sodium alginate, dissolved in said water, are mixed and homogenized. The resulting product is a low-solvent content cutback emulsion.

EXAMPLE 26

5.90 parts of emulsion of Example 21, 47.05 parts of a 3% water solution of high viscosity methyl cellulose, 47.05 parts of water are mixed and homogenized. Under Homomixer agitation 100 parts of mineral spirits are stirred into the former emulsion. The resulting product is a high solvent content cut-back emulsion.

EXAMPLE 27

Example 26 is repeated, using xylol, instead of the mineral spirits. The resulting cut-back emulsion yields high color value, when mixed with oil-in-water color concentrates.

In oil-in-water cut-back emulsions as bodying agents, not mentioned in the above examples, the following may be used: gum tragacanth, dextrin, starch solutions, sodium acrylate and sodium methacrylate, hydroxy ethyl cellulose of the water soluble and alkali soluble types, etc. As emulsifying agents sodium alkyl sulfates, alkyl sulfonates, aryl sulfonates, alkyl-aryl sulfonates, aryl-alkyl sulfonates and sulfates, polyethylene oxide condensation products, ethylene glycol esters, etc. may be used. Care should be exercised, that anionic and nonionic agents and systems may be mixed, and cationic agents or systems may be mixed with nonionic agents and systems, but cationic and anionic agents or systems normally cause flocculation of the emulsion or of the pigments.

In the case of emulsion aggregated (emulsion polymerized) binders, solvent retention of the rubbery resin binder has to be considered. Solvents have to be driven off completely, to get final and ultimate performance in laundering, dry cleaning, etc., as retained solvents act as plasticizers and reduce film toughness and abrasion resistance.

Cuts can be made with concentrates and cutback emulsions in proportions of 1:2 to 1:100, as required.

Pigment padding

Because of the lightfastness of pigments and ease of their application, to obtain solid color effects, pigment padding is becoming more and more popular to replace dyeing. The E-polyester oil-in-water emulsions are suitable for pigment padding. The color concentrates may be diluted with water, instead of the cut-back emulsion to the desired color strength. If higher viscosity is required, a mixture of the color concentrate and some cut-back emulsion may be diluted with water. In the event low viscosities can be tolerated, the amount of protective colloid may be reduced in the binder emulsion and color concentrate, whereby laundering resistance increases.

There are two difficulties in the way of popularizing pigment padding. One is crocking. The E-polyester binder emulsions, as formulated above, show very low crocking and can be considered as practically non-crocking for many purposes, thereby eliminating this drawback of pigment padding. The second difficulty is represented by the phenomenon called pigment migration. During the drying operation the pigments migrate towards the heat and cause streaks and uneven color effects. If the drying tunnels or chambers show the slightest differences in spots with regard to temperature, pigment migration will take place. It is very difficult, even with the most modern equipment to have uniform temperatures all over the drying chambers. The emulsion aggregated (emulsion polymerized) E-polyester binders are solidified in the emulsion and therefore prevent the migration of the pigments. This particular performance of these new emulsions permits their use with great advantage in pigment padding to produce solid color effects by pigments.

WATER-FREE PRINTING COLORS

The E-polyester binders are not only suitable for pigment printing when emulsified with water into oil-in-water or water-in-oil emulsions, but they are suitable for pigment printing from solutions in organic solvents, in substantial absence of water. Such pigment colors have particular advantage in competition with lacquer printing colors. Lacquer pigment colors are primarily used on finished materials, where the finish will wash off in laundering and where hiding of pre-dyed shades is required without discharging, but by high pigment concentrations. Nitrocellulose lacquers are not laundering resistant, whereas ethyl cellulose lacquers show drawbacks in dry cleaning resistance and in resistance to ironing. The E-polyester resins form laundering and drycleaning resistant prints and they can be used in the equipment of lacquer printers, where the entire heat treatment is around 120 to 180° F. for one minute or less. Organic solvents need very little B. t. u.'s to evaporate, whereas water needs about ten times as much. By working with water-free systems, fast solvent evaporation is obtainable at moderate heat and in short periods.

EXAMPLE 28

200 parts of E-polyester solution of Example 2, 16.7 parts of phthalocyanine green and 8.3 parts of china clay are milled on a three roller mill, to form a fine particle size dispersion of the pigment. The resulting product may be used for printing on textiles.

EXAMPLE 29

200 parts of E-polyester solution of Example 2, 20 parts of Naphthol AS type insoluble azo red, 10 parts of china clay, are ground, until the pigment particle size is fine enough, to suit printing ink specifications. The resulting product may be used for printing on fabric, which is finished with a starch finish.

EXAMPLE 30

Example 29 is repeated, using as red pigment a manganese salt of a beta-ortho-naphthoic acid soluble azo type pigment.

EXAMPLE 31

As small quantities of water may be tolerated by lacquer printers, 100 parts of the product of Example 28, is mixed under constant agitation, with a mixture of 45.5 parts of water, 5.5 parts of a 10% low viscosity methyl cellulose solution in water and 0.25 part of glacial acetic acid. The water mixture is added slowly, under agitation, to the pigment color. The mix is homogenized. The product so obtained has a nice printable pasty consistency, has lower penetration, and is a water-in-oil emulsion.

SOLID COLOR EFFECTS BY OTHER MEANS THAN PADDING

Solid color effects may be obtained by the use of the textile colors of this invention, by other methods than by padding. One such method is to print the entire surface with a blotch roller, also called knurled roller. The back side is printed in a second operation. Another method is using knife coater or reverse roller coaters. A still further method is immersing the fabric in a tank containing the color, and passing same in between two doctor blades, which take off excess color. This is followed by tower dryers, or tunnel dryers.

I claim:

1. A textile decorating pigment color concentrate comprising a pigment, a water emulsion of a resinous ester of a polyunsaturated fatty oil acid and an alcoholic condensation product of an epihalohydrin with a polynuclear polyhydric phenol and of a volatile organic solvent, said resinous ester being characterized by its ability to reach the "thermoset" stage at temperatures not exceeding 220° F., said color concentrate containing 15% to 40% non-volatile content and 3% to 15% pigment, said pigment being less than 50% of the non-volatile content and having high tinting power, said color concentrate being of pasty consistency and suitable for dilution, and yielding textile decorations with improved crock resistance and laundering resistance.

2. The textile decorating pigment color concentrate of claim 1, in which the resinous alcohol is the condensation product of epichlorhydrin and p'-p-dihydroxydiphenyldimethylmethane.

3. The textile decorating pigment color concentrate of claim 1, which is a water-in-oil emulsion, suitable for reduction with clear water-in-oil cut-back emulsions.

4. The textile decorating pigment color concentrate of claim 1, which is an oil-in-water emulsion, suitable for reduction with clear oil-in-water cut-back emulsions.

5. The textile decorating pigment color concentrate of claim 1, comprising in the water emulsion an alkylated amino-aldehyde resin, which is organic solvent soluble.

6. The textile decorating pigment color concentrate of claim 1, comprising in the water emulsion a butyl alcohol modified melamine formaldehyde resin.

7. The textile decorating pigment color concentrate of claim 1, comprising in the water emulsion a butyl alcohol modified melamine formaldehyde resin and nitrocellulose.

8. The textile decorating pigment color concentrate of claim 1, in which the pigment is an in water deflocculated dispersed pigment, and its particles are surrounded by water.

9. The textile decorating pigment color concentrate of claim 1, in which the pigment is an in resin deflocculated dispersed pigment, and its particles are surrounded by the resinous binder.

10. The textile decorating pigment color concentrate of claim 1, in which the fatty acid component of the ester is a drying oil fatty acid.

11. The textile decorating pigment color concentrate of claim 1, in which the fatty acid component of the ester is dehydrated castor oil fatty acid.

12. The textile decorating pigment color concentrate of claim 1 which is an oil-in-water emulsion and which contains the resinous ester in an emulsion aggregated state.

13. A printing paste comprising the product of claim 1 and also comprising sodium-formaldehyde-sulfoxylate.

14. A printing paste comprising the product of claim 1 and also comprising zinc sulfoxylate.

15. A textile decorating pigment color concentrate comprising a pigment, a water emulsion of a resinous ester of a polyunsaturated fatty oil acid and an alcoholic condensation product of an epihalohydrin with a polynuclear polyhydric phenol and of a volatile organic solvent, said resinous ester being characterized by its ability to reach the "thermoset" stage at temperatures not exceeding 220° F., said color concentrate containing 15% to 40% non-volatile content and 3% to 15% pigment, said pigment being less than 50% of the non-volatile content and having high tinting power, in said color concentrate the resin content being from about 8.75% to about 22.65%, the solvent content being from about 16.3% to about 64.7% and the water being from about 15% to about 58.2%, said color concentrate being of pasty consistency and suitable for dilution and yielding textile decorations with improved crock resistance and laundering resistance.

16. The color concentrate of claim 1, which is a water-in-oil emulsion, suitable for reduction with clear water-in-oil extender emulsions, and which contains from about 33.5% to about 64.7% of solvent and from about 15% to about 34.7% water.

17. The color concentrate of claim 1, which is an oil-in-water emulsion, suitable for reduction with clear oil-in-water extender emulsions, and which contains from about 16.3% to about 34.6% of solvent and from about 34.2% to about 58.2% of water.

18. A textile decorating pigment color concentrate comprising a pigment, a water emulsion of a resinous ester of a polyunsaturated fatty oil acid and an alcoholic condensation product of an epihalohydrin with a polynuclear polyhydric phenol and of a volatile organic solvent, said resinous ester being characterized by its ability to reach the "thermoset" stage at temperatures not exceeding 220° F., said color concentrate having 15% to 40% non-volatile content and 3% to 15% pigment content, said pigment being less than 50% of the non-volatile content and having high tinting power, and said color concentrate containing on each hundred parts of dry resinous ester, from about 12.14 parts to about 70.51 parts of said pigment, from about 139.15 parts to about 467.52 parts of water, from about 131.35 parts to about 602.05 parts of solvent, said color concentrate being of viscous consistency and suitable for dilution and yielding textile decorations with improved crock resistance and laundering resistance.

19. The composition of claim 18, in which the non-volatile content of the color concentrate is about 39.46%, the pigment having high tinting power is about 5.27% and which contains about 21.09% barium sulfate.

LASZLO AUER.

References Cited in the file of this patent
UNITED STATES PATENTS

| Number | Name | Date |
|---|---|---|
| 2,060,715 | Arvin | Nov. 10, 1936 |
| 2,267,620 | Cassel | Dec. 23, 1941 |
| 2,342,642 | Cassel | Feb. 29, 1944 |
| 2,383,937 | Kienle et al. | Sept. 4, 1945 |
| 2,444,333 | Castan | June 29, 1948 |
| 2,456,408 | Greenlee | Dec. 14, 1948 |
| 2,466,066 | Weiss | Apr. 5, 1949 |